(12) United States Patent
Abels et al.

(10) Patent No.: US 9,631,771 B1
(45) Date of Patent: Apr. 25, 2017

(54) MANUALLY ACTUATABLE HANGER FOR SUSPENDING ARTICLES FROM A TUBULAR CARRIER STRUCTURE

(71) Applicant: Four Strong Corporation, Chapel Hill, NC (US)

(72) Inventors: David Abels, Chapel Hill, NC (US); Graham Wimberly, Charleston, SC (US); Boban Djurdjevic, Beocin (RS); Hannah L. Abels, Chapel Hill, NC (US)

(73) Assignee: Four Strong Corporation, Chapel Hill, NC (US)

(*) Notice: Subject to any disclaimer, the term of this patent is extended or adjusted under 35 U.S.C. 154(b) by 0 days.

(21) Appl. No.: 14/943,414

(22) Filed: Nov. 17, 2015

(51) Int. Cl.
| A47B 96/00 | (2006.01) |
| F16M 13/02 | (2006.01) |
| F16B 45/02 | (2006.01) |
| F16B 2/10 | (2006.01) |
| F21V 33/00 | (2006.01) |
| F21L 4/00 | (2006.01) |
| G08B 3/10 | (2006.01) |
| G08B 21/02 | (2006.01) |

(52) U.S. Cl.
CPC ............ *F16M 13/022* (2013.01); *F16B 2/10* (2013.01); *F16B 45/02* (2013.01); *F21L 4/00* (2013.01); *F21V 33/0004* (2013.01); *G08B 3/10* (2013.01); *G08B 21/02* (2013.01)

(58) Field of Classification Search
CPC ......... F16M 13/022; F16B 45/02; F16B 2/10; F16B 7/00; F21V 33/0004
See application file for complete search history.

(56) References Cited

U.S. PATENT DOCUMENTS

| 25,082 A | * | 8/1859 | Pollak | A44C 5/145 |
| | | | | 24/598.4 |
| 380,687 A | * | 4/1888 | Martin | F16B 45/02 |
| | | | | 24/599.6 |
| 983,404 A | * | 2/1911 | Schartow | F16B 45/02 |
| | | | | 24/599.7 |
| 1,382,849 A | | 6/1921 | Perl | |

(Continued)

FOREIGN PATENT DOCUMENTS

| DE | 319683 A | 3/1920 |
| EP | 2231497 B1 | 9/2014 |
| WO | 2013-134405 A1 | 9/2013 |

OTHER PUBLICATIONS

Handgrey Carabiner. [retrieved on Sep. 3, 2015]. Retrieved from the Internet <URL: http://uncrate.com/stuff/handgrey-carabiner/> 4 pages.

(Continued)

*Primary Examiner* — Amy Sterling
(74) *Attorney, Agent, or Firm* — Withrow & Terranova, P.L.L.C.; Vincent K. Gustafson

(57) ABSTRACT

A manually actuatable hanger suitable for suspending articles from a tubular carrier structure includes jaws that may be actuated to expand a jaw opening to receive the carrier structure, with the jaws biased toward a closed position to engage the carrier structure. The hanger further includes a pivoting gate element that is operable by a user to selectively open a gate opening to provide access to a hook portion, whereby one or more articles may be hung from an interior surface of the hook portion.

20 Claims, 13 Drawing Sheets

(56) References Cited

U.S. PATENT DOCUMENTS

| | | |
|---|---|---|
| 1,521,811 A | 1/1925 | Hartbauer |
| 3,083,431 A | 4/1963 | Lewis |
| 3,956,804 A | 5/1976 | Gatof et al. |
| 4,279,062 A | 7/1981 | Boissonnet |
| 4,376,383 A | 3/1983 | Wolter |
| 4,546,523 A | 10/1985 | Bailey, Jr. |
| 4,691,416 A | 9/1987 | Nakayama et al. |
| 5,117,539 A | 6/1992 | Shrader et al. |
| 5,586,374 A | 12/1996 | Nishida |
| 5,664,304 A | 9/1997 | Tambornino |
| 5,913,479 A | 6/1999 | Westwood, III |
| 6,161,264 A | 12/2000 | Choate |
| 6,230,375 B1 | 5/2001 | Catlett |
| 6,438,809 B1 | 8/2002 | Camaiani |
| D493,092 S | 7/2004 | Kalat |
| 6,907,645 B2 | 6/2005 | Jenson et al. |
| 7,051,410 B2 | 5/2006 | Simond |
| D607,712 S | 1/2010 | Kelleghan |
| D618,537 S | 6/2010 | Panzer et al. |
| 7,946,005 B2 | 5/2011 | Lee |
| D669,764 S | 10/2012 | Kelleghan |
| D698,625 S | 2/2014 | Liang |
| D698,626 S | 2/2014 | Ormsbee et al. |
| 8,752,254 B2 | 6/2014 | Perner |
| D716,639 S | 11/2014 | Kelleghan |
| 2005/0144730 A1 | 7/2005 | Barber et al. |
| 2006/0162138 A1 | 7/2006 | Kimura |
| 2009/0183347 A1 | 7/2009 | Abels |
| 2010/0264281 A1 | 10/2010 | Bevirt et al. |
| 2011/0138587 A1 | 6/2011 | Walker et al. |

OTHER PUBLICATIONS

Carabiner Bottle Opener. [retrieved on Mar. 7, 2016]. Retrieved from the Internet <URL: http://www.infmetry.com/carabiner-bottle-opener> 1 page.

International Search Report and Written Opinion of the International Search Authority (forms PCT/ISA1210 and PCT/ISA/237) and Notification of Transmittal of the International Search Report and Written Opinion of the International Search Authority (form PCT/ISA/220), for International Application No. PCT/US2016/062550 dated Jan. 31, 2017 (8 pages).

\* cited by examiner

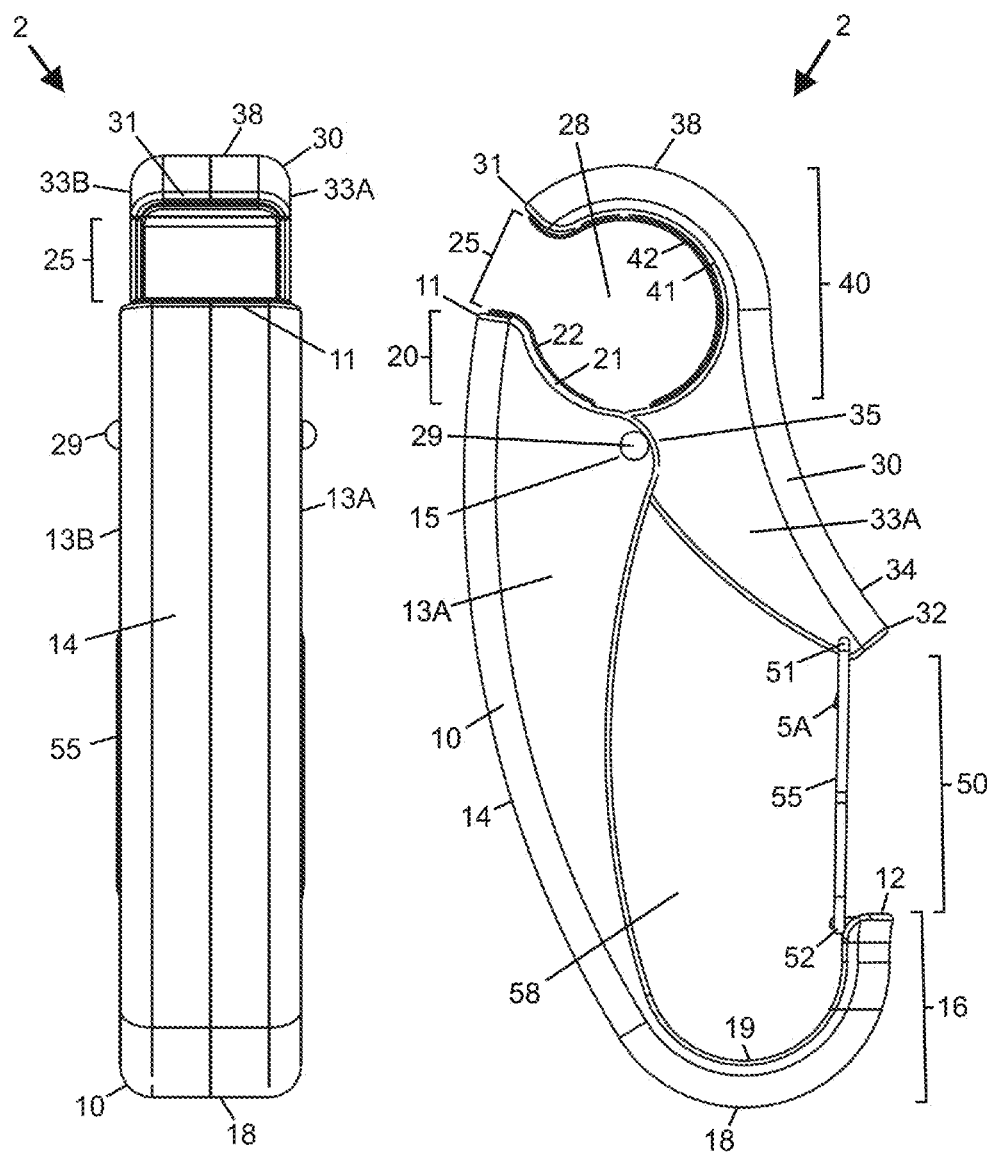
FIG._1   FIG._2

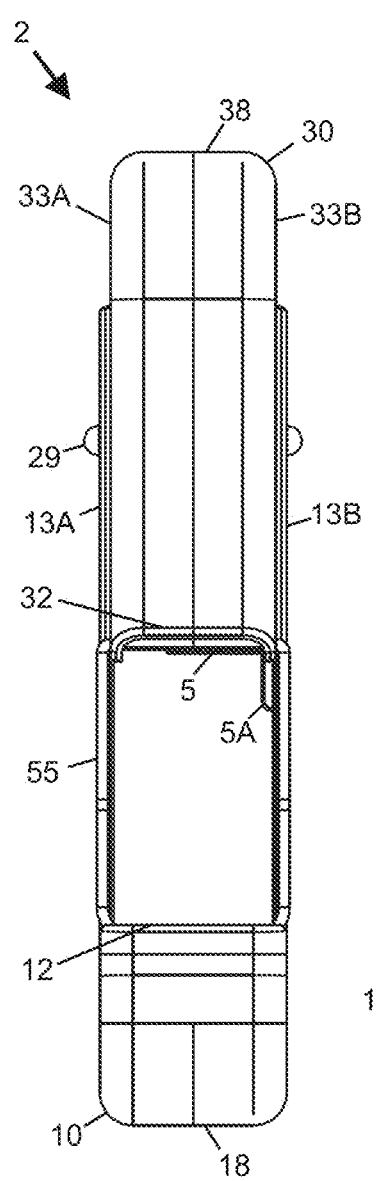
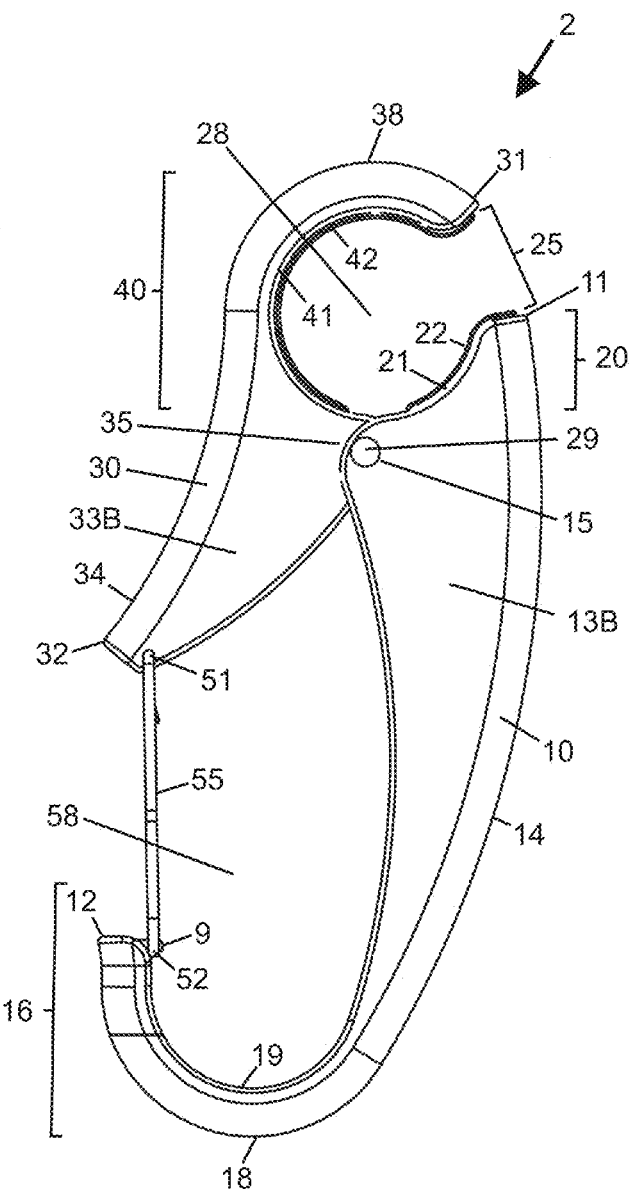
FIG._3
FIG._4

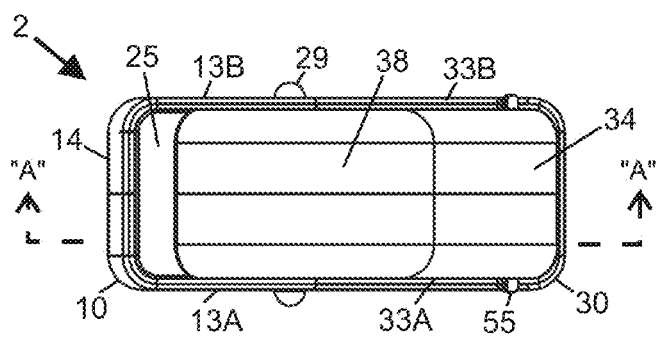
FIG._5
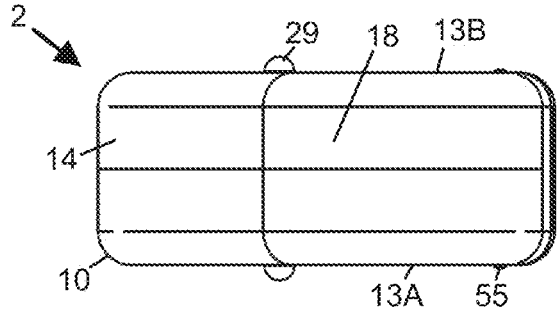
FIG._6
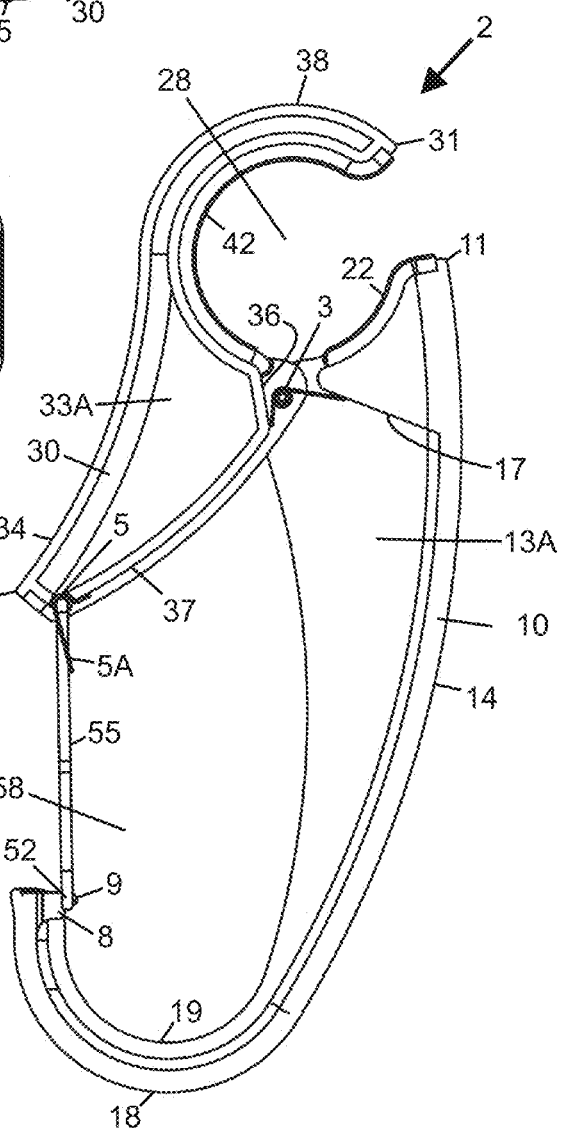
FIG._7

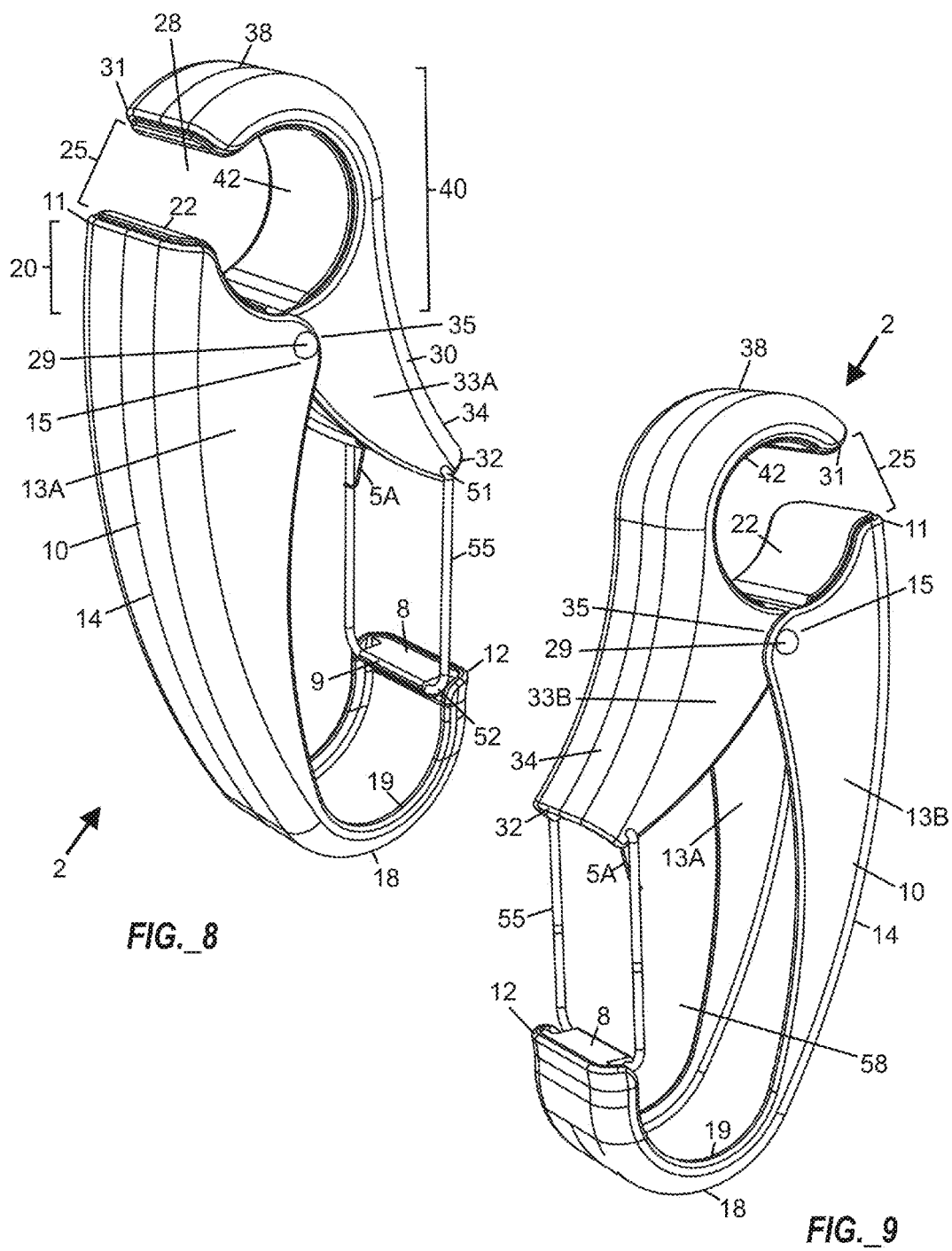
FIG._8
FIG._9

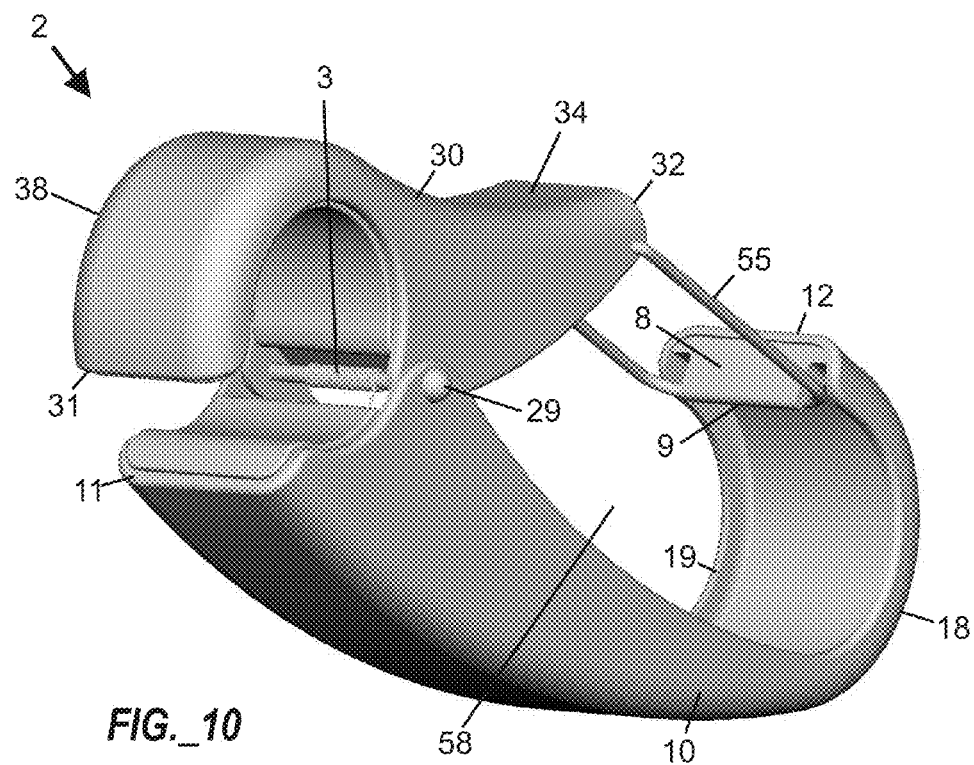
FIG._10
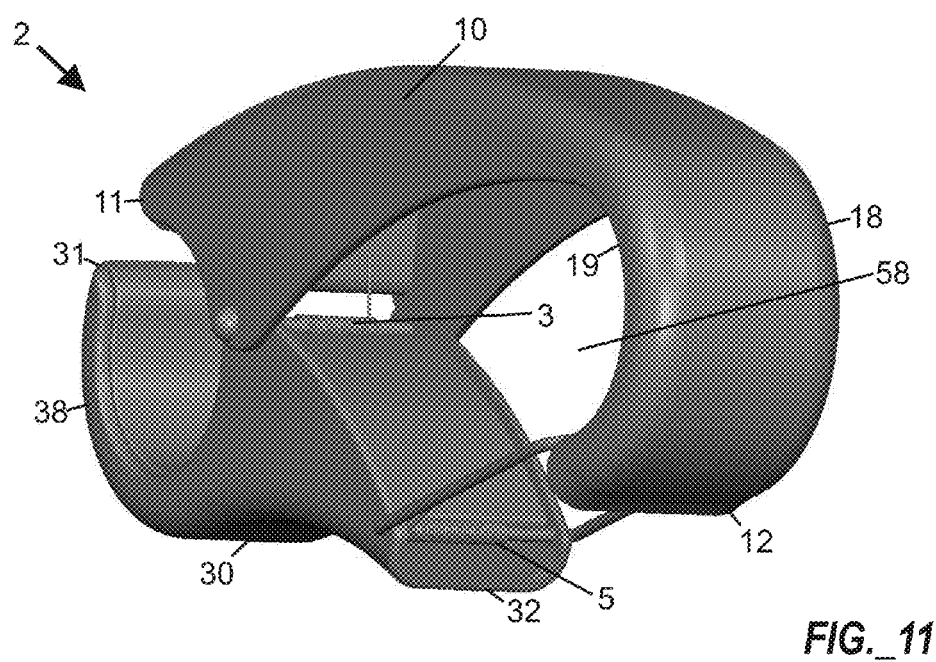
FIG._11

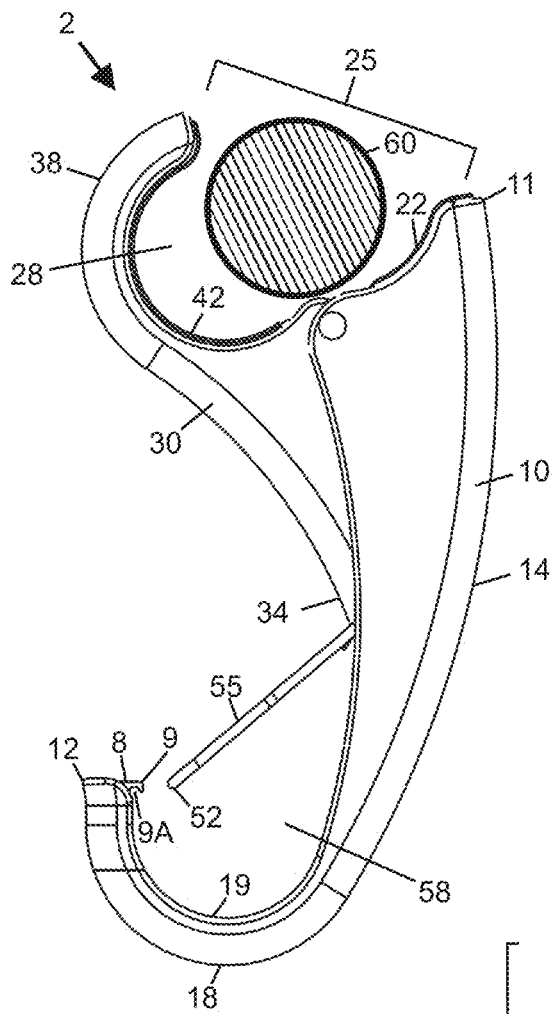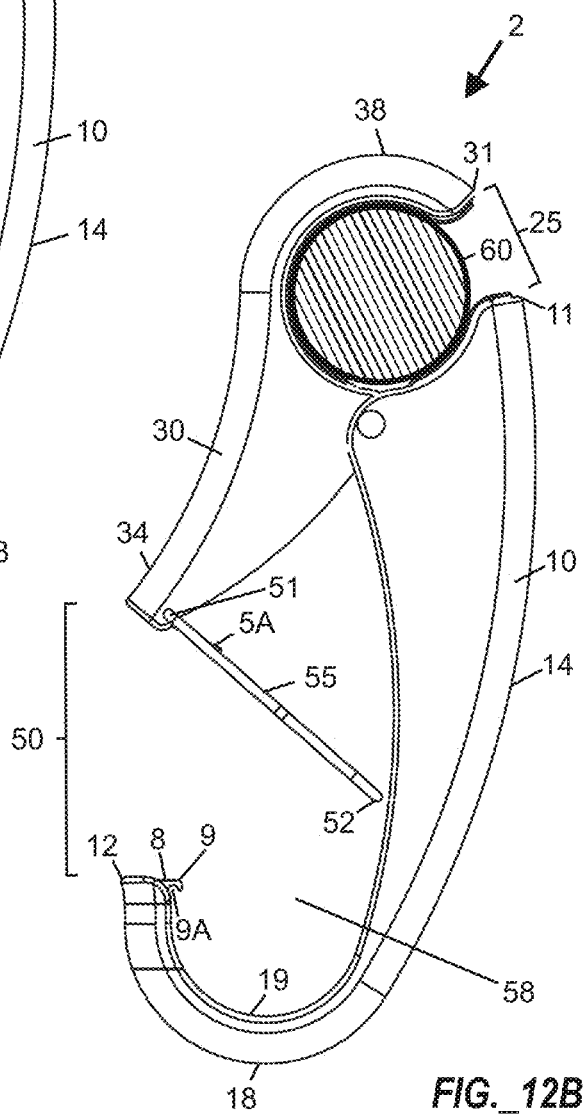
FIG._12A
FIG._12B

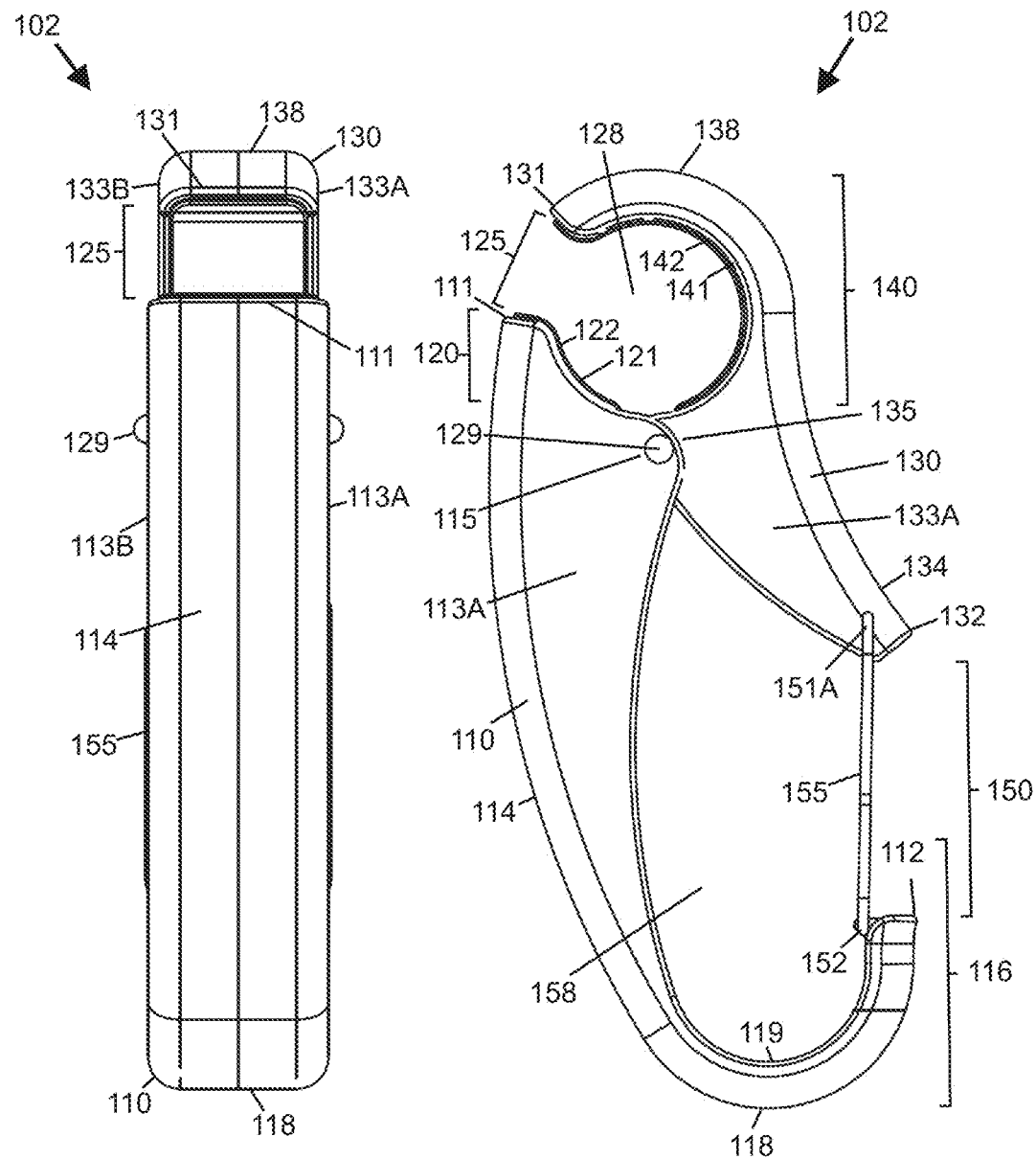
FIG._13     FIG._14

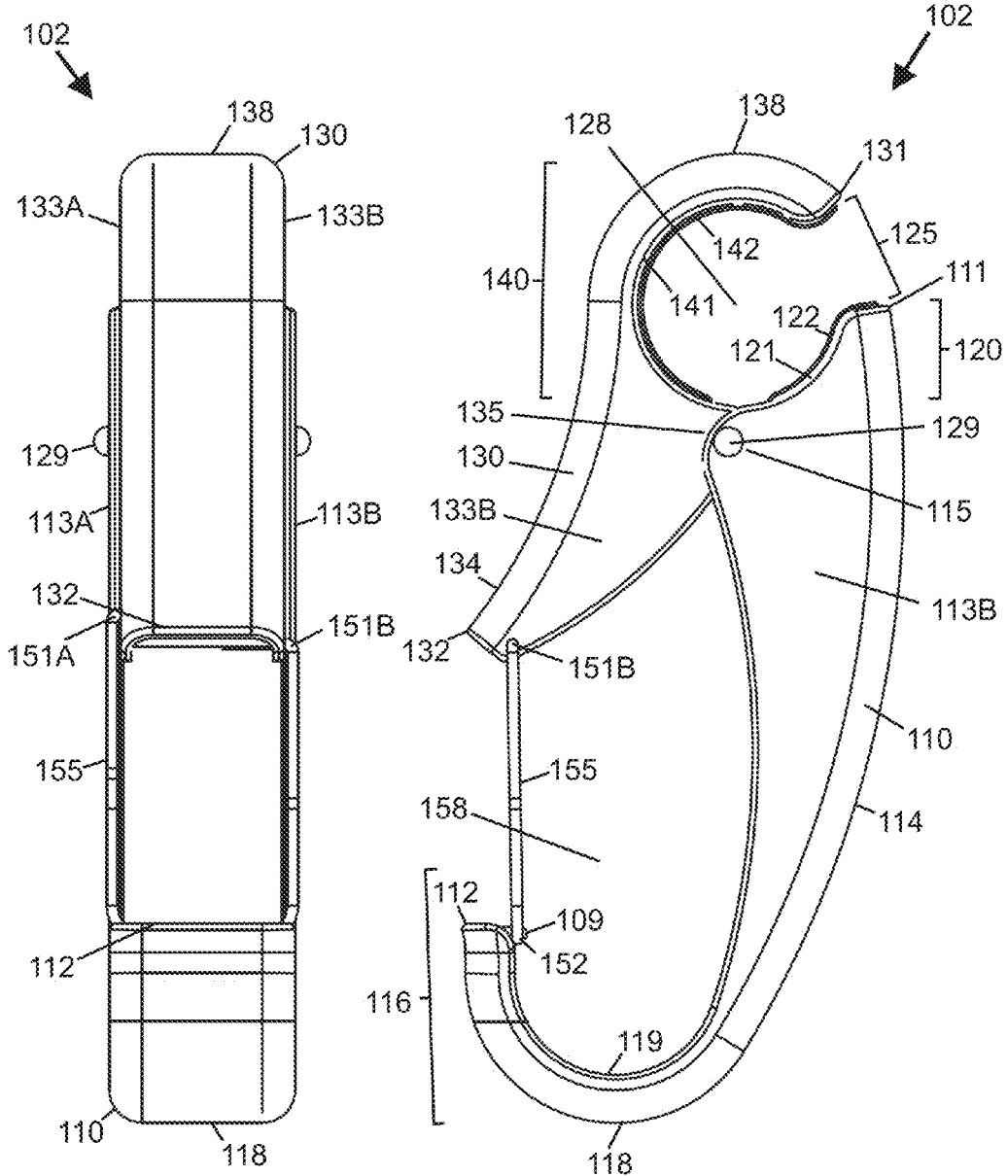
FIG._15  FIG._16

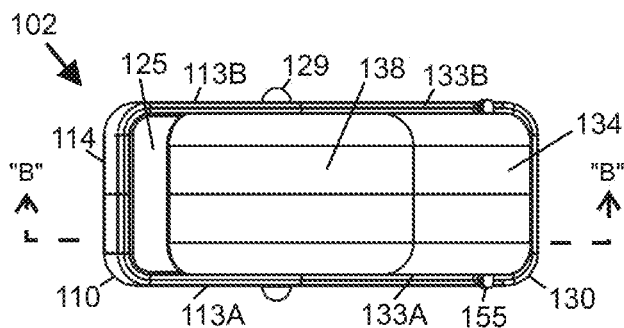
FIG._17
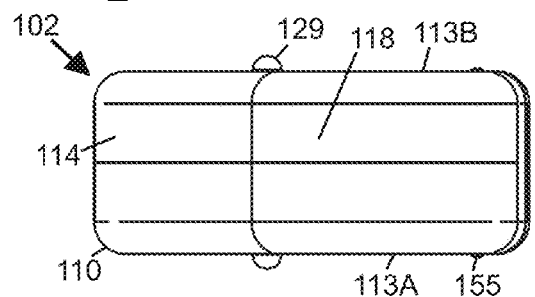
FIG._18
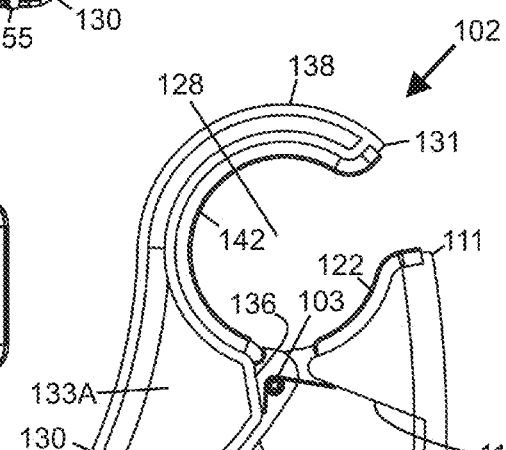
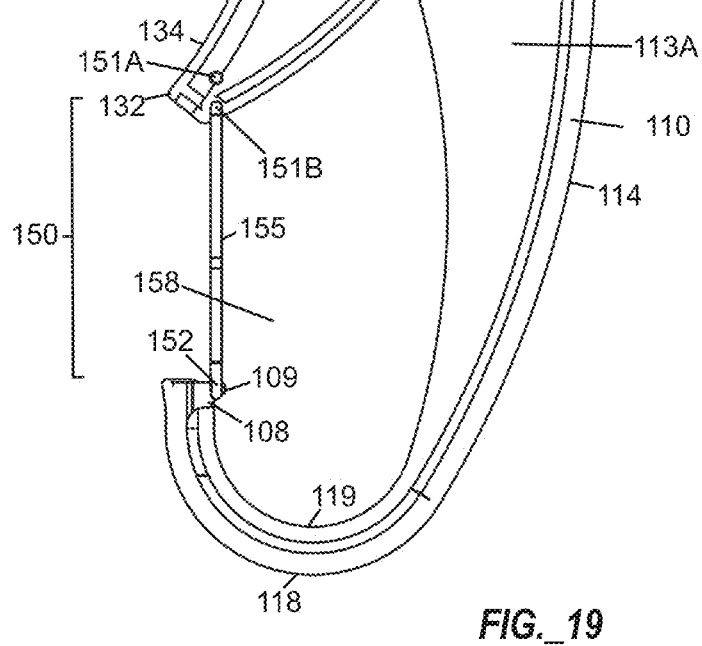
FIG._19

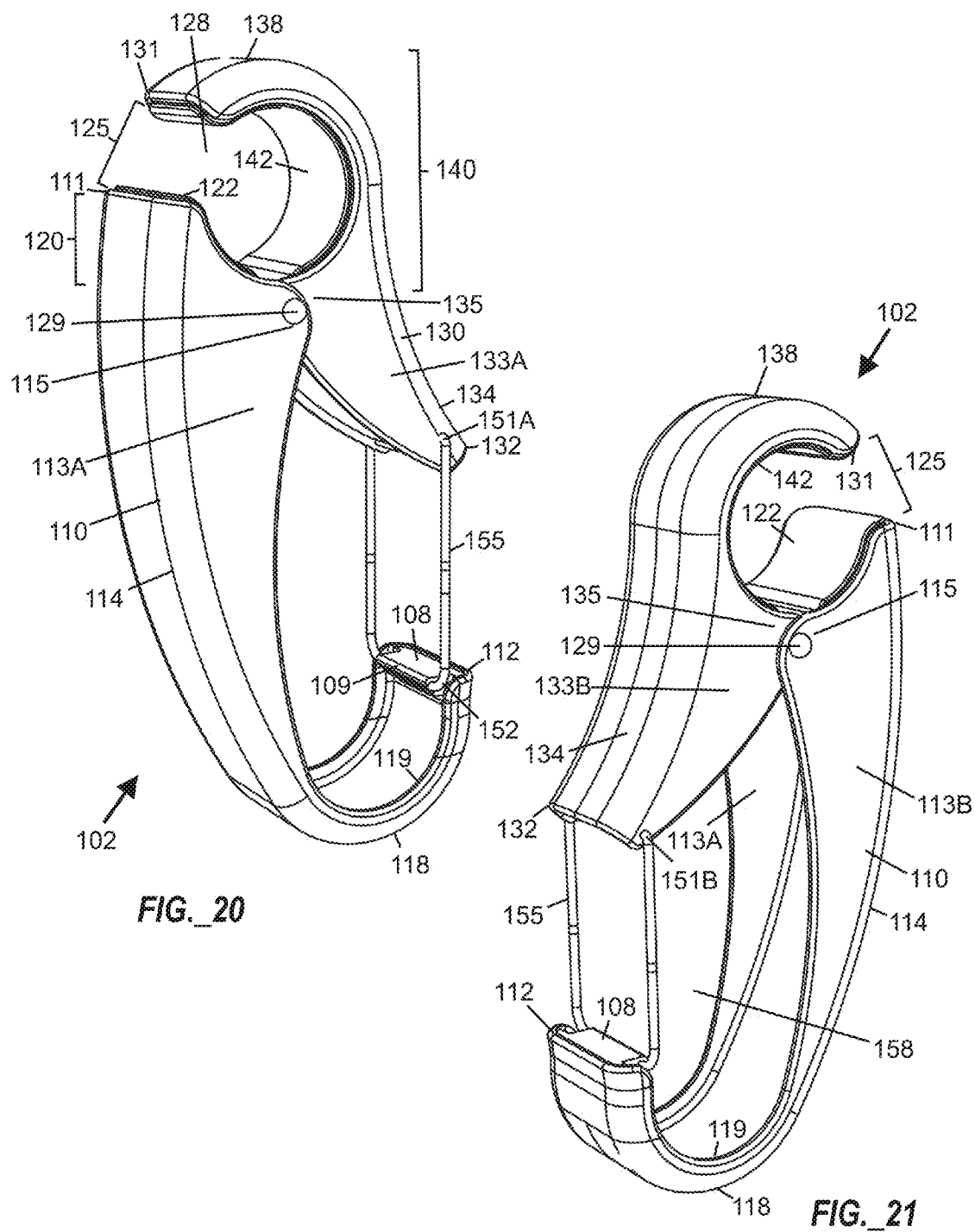
FIG._20
FIG._21

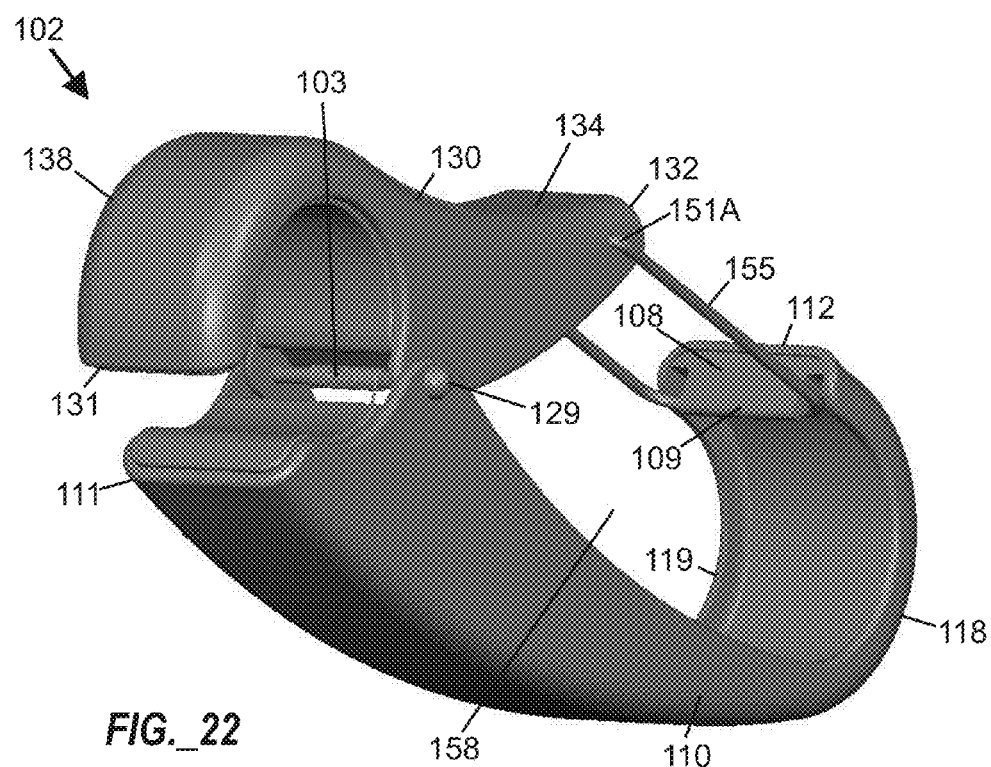
FIG._22
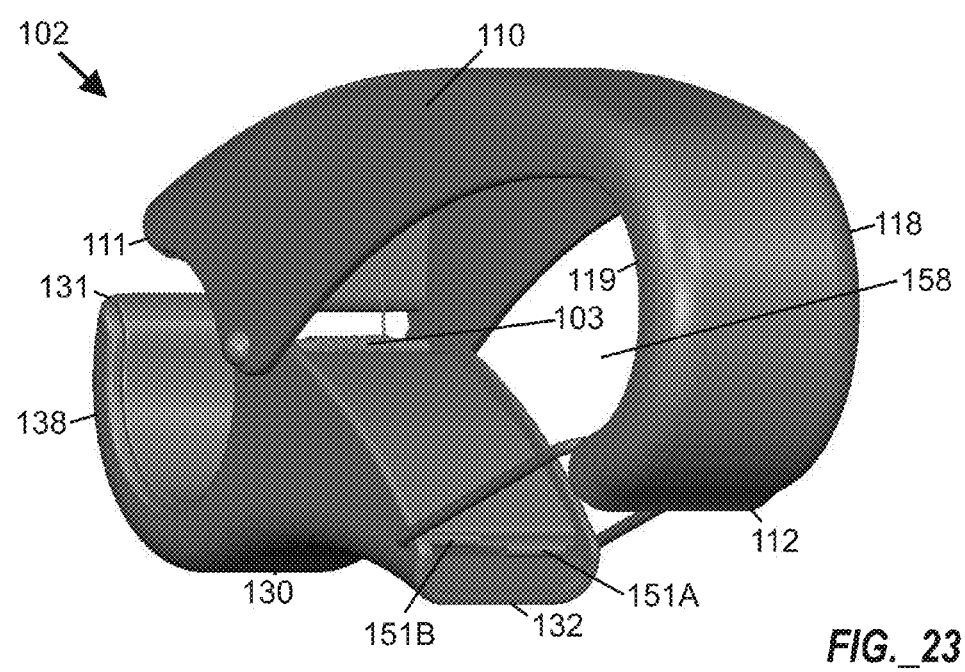
FIG._23

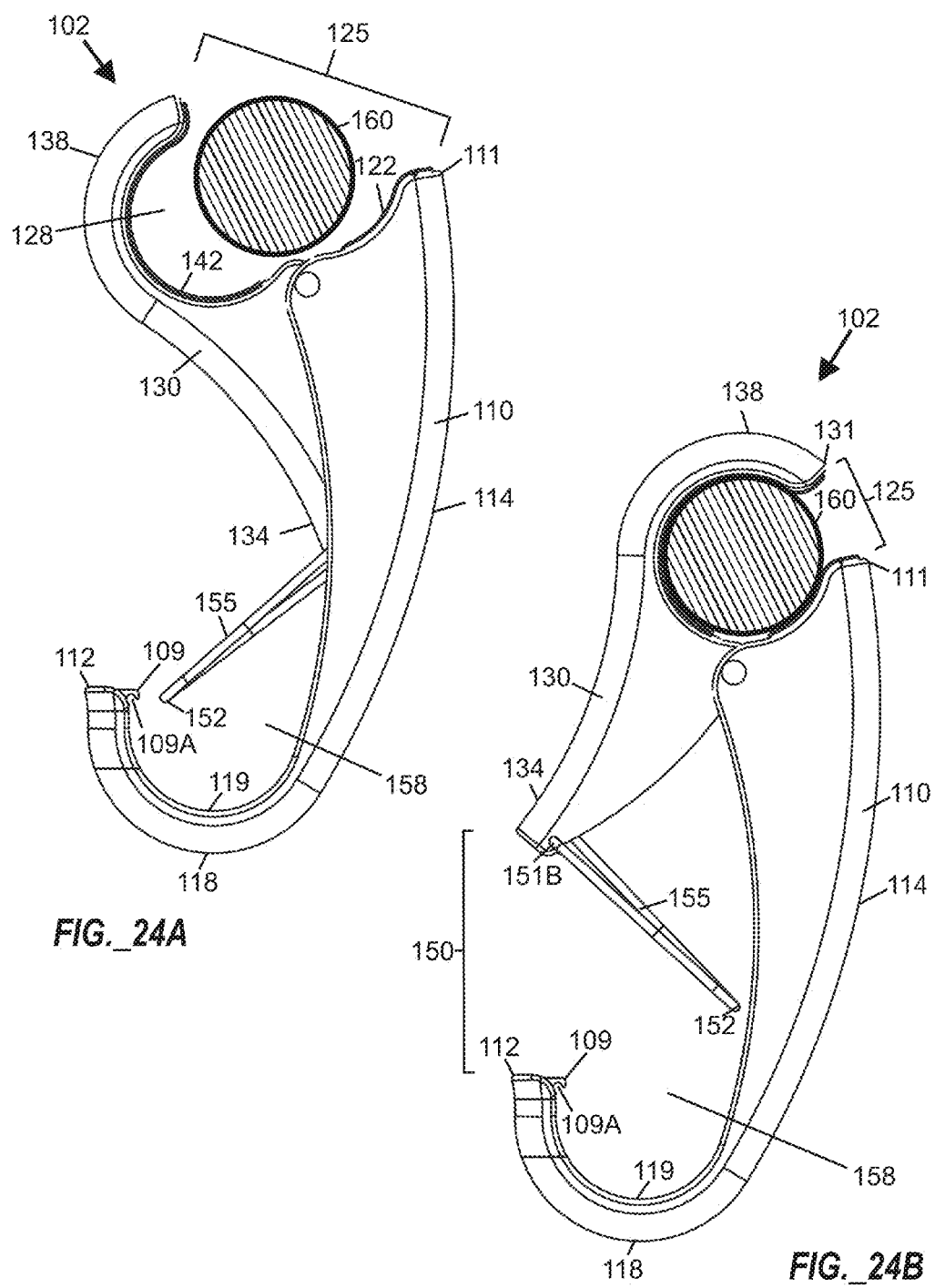
FIG._24A
FIG._24B

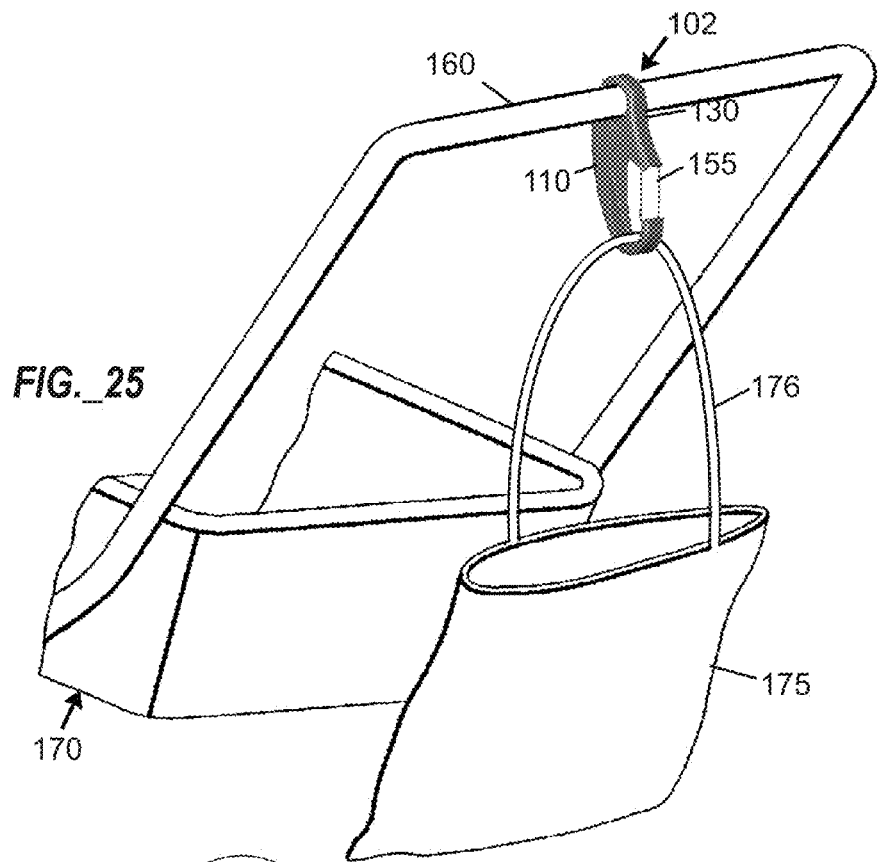
FIG._25
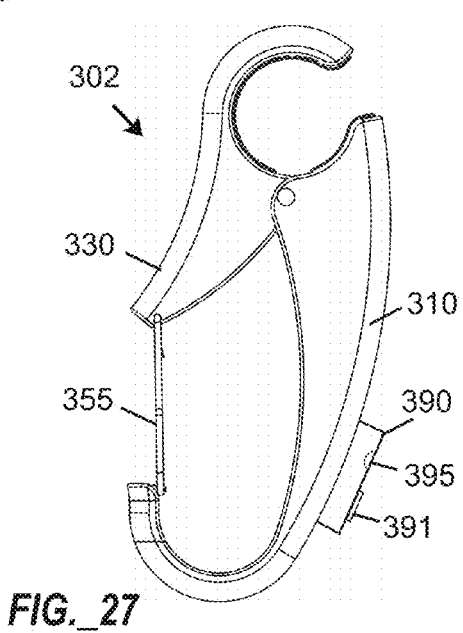
FIG._26
FIG._27

MANUALLY ACTUATABLE HANGER FOR SUSPENDING ARTICLES FROM A TUBULAR CARRIER STRUCTURE

TECHNICAL FIELD

The present disclosure relates to hangers suitable for suspending articles from tubular or cylindrical carrier structures, and more particularly to a manually actuatable hanger that is arranged to grip a carrier structure and that includes an articulated gate element that may be opened and closed to provide secure access to an interior surface of a hook portion.

BACKGROUND

Carabiners have long been used in climbing (e.g., for hanging from ropes and for holding ropes), and their functionality has expanded to other areas such as holding keys, restraining a dog on a leash, and holding various loop-handled items (such as purses, shopping bags, diaper bags, etc.) from a cylindrical handle of a mobile vehicle such as a baby stroller or a shopping cart. However, a carabiner has the tendency to slip from side to side on such a handle, due to the weight of the article suspended from the carabiner and/or due to momentum (e.g., swinging) of the suspended article. As disclosed in U.S. Patent Application Publication No. 2009/0183347 A1 to Abels, addition of anti-slip materials such as a foam rubber sleeve to at least an apex portion of a carabiner may reduce slippage of a carabiner attached to a cylindrical handle, thereby reducing the likelihood that a suspended article may slip and possibly damage the article, impact a child seated in a stroller or shopping cart, or impact a person using the mobile vehicle. However, the slip resistance of even a sleeved carabiner from which weighty articles are suspended may be limited when a cylindrical handle of a mobile vehicle (such as a baby stroller) is not horizontally oriented, when a mobile vehicle is jostled (e.g., over bumps in pavement), or when a mobile vehicle is oriented in a non-horizontal position (e.g., directed over an angled surface). Accordingly, a need exists for improved hangers suitable for suspending articles from tubular or cylindrical carrier structures of various orientations and/or in various situations.

SUMMARY

Disclosed herein is a manually actuatable hanger suitable for suspending one or more articles from a cylindrical or tubular carrier structure (e.g., of a mobile vehicle), wherein jaws of the hanger may be actuated to expand a jaw opening to receive the carrier structure, and the jaws are biased (e.g., with a torsion spring) toward a closed position to engage the carrier structure. The hanger further includes a pivoting gate element that is operable by a user to selectively open a gate opening to provide access to a hook portion, whereby one or more articles may be hung from an interior surface of the hook portion. Such a hanger is easily adjustable, affirmatively resists slipping when the jaws engage a carrier structure, and is suitable for use with various different types, sizes, and configurations of cylindrical or tubular carrier structures to provide security and safety for a user seeking to hang one or more articles from a carrier structure. It is also possible to use the hanger on carriers that are non-rounded or provided with irregular or non-uniform cross-sectional shapes.

In one aspect, the disclosure relates to a manually actuatable hanger including a main body, a rocker element, a first biasing element, and a pivoting gate element. The main body includes a first body end, a second body end, a first jaw portion proximate to the first body end, a hook portion proximate to the second body end, and a first pivot region between the first jaw portion and the hook portion. The rocker element includes a first rocker end, a second rocker end, a second jaw portion proximate to the first rocker end, a manually depressible tab portion proximate to the second rocker end, and a second pivot region arranged between the second jaw portion and the depressible tab portion, wherein the second pivot region is registered with the first pivot region and permits the rocker element to pivot relative to the main body. The first biasing element is configured to exert a rotational force between the main body and the rocker element, and is configured to resist expansion of a jaw opening between the first jaw portion and the second jaw portion. The second jaw portion is configured to be pivoted away from the first jaw portion to expand the jaw opening when the depressible tab portion is pressed by a user toward the hook portion. A gate opening is provided between the depressible tab portion and the second body end. The pivoting gate element extends between the depressible tab portion and the second body end, and is operable by the user to selectively open the gate opening to provide access to the hook portion, whereby one or more articles may be hung from an interior surface of the hook portion.

In certain embodiments, a manually actuatable hanger as disclosed herein includes a pivot pin, a pivot rod, or a pivot cylinder extending through the first pivot region and the second pivot region. In certain embodiments, the pivoting gate element is pivotally linked to the rocker element proximate to the second rocker end, and is arranged to pivot inward toward the interior surface of the hook portion. In certain embodiments, the pivoting gate element is biased to resist opening of the gate opening. In certain embodiments, the pivoting gate element includes a first end received in a first aperture defined in a first side surface of the depressible tab portion, the pivoting gate element includes a second end received in a second aperture defined in a second side surface of the depressible tab portion, and the first aperture and the second aperture are axially offset from one another to cause the pivoting gate element to be biased to resist opening of the gate opening. In certain embodiments, a second biasing element is configured to bias the pivoting gate element to resist opening of the gate opening. In certain embodiments, the first jaw portion and the second jaw portion are configured to receive and to grip a cylindrical or tubular carrier structure. In certain embodiments, the first jaw portion includes a first arcuate inner gripping surface, and the second jaw portion includes a second arcuate inner gripping surface. In certain embodiments, the first arcuate inner gripping surface comprises a first arc length, the second arcuate inner gripping surface comprises a second arc length, and the second arc length is at least about twice the first arc length. In certain embodiments, a resilient material is arranged in or along the first jaw portion and the second jaw portion. In certain embodiments, a travel stop is arranged at the second body end, wherein the travel stop comprises an inwardly protruding tab arranged to protrude through a portion of the pivoting gate element when the gate opening is closed by the pivoting gate element. In certain embodiments, a hanger includes a battery-powered flashlight element that is affixed to or integrated with one of the main body, the rocker element, or the pivoting gate element. In certain embodiments, a hanger includes a battery-powered audible alarm generating element that is affixed to or integrated with one of the main body, the rocker element, or the pivoting gate element.

In another aspect, a method for suspending one or more articles from a cylindrical or tubular carrier structure using a manually actuatable hanger as disclosed herein is provided, with the method including multiple steps. A first step includes pressing the depressible tab portion toward the hook portion to cause the second jaw portion to pivot away from the first jaw portion and expand the jaw opening. A second step includes inserting the cylindrical or tubular carrier structure into the jaw opening. A third step includes releasing pressure applied to the depressible tab portion to cause the first jaw portion and the second jaw portion to grip the cylindrical or tubular carrier structure. A fourth step includes operating the pivoting gate element to open the gate opening. A fifth step includes inserting the one or more articles through the gate opening to be hung from the interior surface of the hook portion.

In certain aspects, any of the preceding aspects or other features disclosed here may be combined for additional advantage.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

FIG. 1 is a front elevation view illustration of a manually actuatable hanger for suspending articles from a cylindrical or tubular carrier structure according to a first embodiment, with jaws and a gate element both in an unactuated position.

FIG. 2 is a left side elevation view illustration of the hanger of FIG. 1.

FIG. 3 is a rear elevation view illustration of the hanger of FIGS. 1 and 2.

FIG. 4 is a right side elevation view illustration of the hanger of FIGS. 1 to 3.

FIG. 5 is a top plan view illustration of the hanger of FIGS. 1 to 4.

FIG. 6 is a bottom plan view illustration of the hanger of FIGS. 1 to 5.

FIG. 7 is a right side cross-sectional view illustration of the hanger of FIGS. 1 to 6, taken along section line "A"-"A" illustrated in FIG. 5.

FIG. 8 is a front perspective view illustration of the hanger of FIGS. 1 to 7.

FIG. 9 is a rear perspective view illustration of the hanger of FIGS. 1 to 8.

FIG. 10 is a front perspective view rendering of the hanger of FIGS. 1 to 9.

FIG. 11 is a rear perspective view rendering of the hanger of FIG. 1 to 10.

FIG. 12A is a right side elevation view illustration of the hanger of FIGS. 1 to 11, with jaws of the hanger in an actuated position to expand a jaw opening to receive a cylindrical carrier structure.

FIG. 12B is a right side elevation view illustration of the hanger and cylindrical carrier structure of FIG. 12A, with jaws of the hanger in an unactuated position to cause jaws of the hanger to engage the cylindrical carrier structure, and with the pivoting gate element pivoted inward toward the interior surface of the hook portion.

FIG. 13 is a front elevation view illustration of a manually actuatable hanger for suspending articles from a cylindrical or tubular carrier structure according to a second embodiment, with a jaws and a gate element both in an unactuated position.

FIG. 14 is a left side elevation view illustration of the hanger of FIG. 13.

FIG. 15 is a rear elevation view illustration of the hanger of FIGS. 13 and 14.

FIG. 16 is a right side elevation view illustration of the hanger of FIGS. 13 to 15.

FIG. 17 is a top plan view illustration of the hanger of FIGS. 13 to 16.

FIG. 18 is a bottom plan view illustration of the hanger of FIGS. 13 to 17.

FIG. 19 is a right side cross-sectional view illustration of the hanger of FIGS. 13 to 18, taken along section line "B"-"B" illustrated in FIG. 17.

FIG. 20 is a front perspective view illustration of the hanger of FIGS. 13 to 19.

FIG. 21 is a rear perspective view illustration of the hanger of FIGS. 13 to 20.

FIG. 22 is a front perspective view rendering of the hanger of FIG. 13 to 21.

FIG. 23 is a rear perspective view rendering of the hanger of FIG. 13 to 22.

FIG. 24A is a right side elevation view illustration of the hanger of FIGS. 13 to 23, with jaws of the hanger in an actuated position to expand a jaw opening to receive a cylindrical carrier structure.

FIG. 24B is a right side elevation view illustration of the hanger and cylindrical carrier structure of FIG. 24A, with jaws of the hanger in an unactuated position to cause jaws of the hanger to engage the cylindrical carrier structure, and with the pivoting gate element pivoted inward toward the interior surface of the hook portion.

FIG. 25 is a perspective view of a manually actuatable hanger as disclosed herein affixed to a cylindrical or tubular carrier structure of a mobile vehicle such as a baby stroller or a shopping cart, with a handled article suspended from the hanger.

FIG. 26 is a right side elevation view illustration of a manually actuatable hanger for suspending articles from a cylindrical or tubular carrier structure according to a third embodiment, with the hanger including an integrated flashlight.

FIG. 27 is a right side elevation view illustration of a manually actuatable hanger for suspending articles from a cylindrical or tubular carrier structure according to a fourth embodiment, with the hanger including an audible alarm generating element.

DETAILED DESCRIPTION

As noted previously, a need exists for improved hangers suitable for suspending articles from tubular or cylindrical carrier structures of various orientations and/or in various situations. Such need is satisfied by manually actuatable hangers disclosed herein. A hanger may be actuated by a user to expand a jaw opening to receive a carrier structure, with the jaws being biased toward a closed position to engage the carrier structure. In certain embodiments, the jaw portions include arcuate inner surfaces (preferably including one or more suitable resilient materials) suitable for gripping a cylindrical or tubular carrier structure. Separately from the jaw opening, the hanger further includes a pivoting gate element that is operable by a user to selectively open a gate opening to provide access to a hook portion, whereby one or more articles may be hung from an interior surface of the hook portion. At a point of use, the hanger may be oriented with the jaw opening arranged above the gate opening, with the two openings being distinct from one another and separated by a pivot pin and registered pivot regions of a main body and a rocker element, respectively. Such a hanger is easily adjustable, affirmatively resists slipping when the jaws engage a carrier structure, and is suitable for use with cylindrical or tubular carrier structures to securely hang one or more articles from a carrier structure.

In certain embodiments, a manually actuatable hanger includes a main body, a rocker element, a first biasing element, and a pivoting gate element. The main body includes a first jaw portion proximate to a first body end, a hook portion proximate to a second body end, and a first pivot region between the first jaw portion and the hook portion. The rocker element includes a second jaw portion proximate to a first rocker end, a manually depressible tab portion proximate to a second rocker end, and a second pivot region arranged between the second jaw portion and the depressible tab portion. The second pivot region is registered with the first pivot region and permits the rocker element to pivot relative to the main body. In certain embodiments, the first pivot region includes a first aperture, the second pivot region includes a second aperture, and a pivot pin, pivot rod, or pivot cylinder extends through the first pivot region and the second pivot region (e.g., like a hinge) to enable pivotal movement between the main body and the rocker element. The first biasing element (which may be embodied in a torsion spring) is configured to exert a rotational force between the main body and the rocker element, and is configured to resist expansion of a jaw opening between the first jaw portion and the second jaw portion. When a user depresses the depressible tab portion (of the rocker element) toward the hook portion, in a manner sufficient to overcome the rotational force exerted by the first biasing element, pivotal movement of the rocker element causes the second jaw portion (of the rocker element) to move away from the first jaw portion (of the main body), thereby expanding a jaw opening between the first and second jaw portions. In such an actuated position (with the jaw opening being in an expanded state), the hanger may be positioned to receive a cylindrical or tubular carrier structure in the jaw opening. Upon release of the depressible tab portion, the first biasing element causes the first and second jaw portions to move toward one another, thereby contracting the jaw opening and causing the first and second jaw portions to engage the carrier structure. In certain embodiments, a gap remains between the first body end and the first rocker end when the first and second jaw portions are in an unactuated position. Such a gap may be maintained by mating of the pivoting gate element with a latch (e.g., an inwardly protruding tab optionally including a detent) associated with a travel stop, wherein the latch is arranged to protrude through a portion of the pivoting gate element when the gate opening is closed by the pivoting gate element. In alternative embodiments, a first body end and a first rocker end may be arranged to touch one another (such that a mouth therebetween is closed) when the jaw portions are in an unactuated position.

In certain embodiments, the first jaw portion includes a first arcuate inner surface, and the second jaw portion includes a second arcuate inner surface. In certain embodiments, one or more resilient materials (e.g., rubber, silicone, silicone rubber, or the like) may be arranged along arcuate inner surfaces of the jaw portions, such as may be useful to increase friction between the jaw portions and a carrier structure, and/or to provide cushioning to prevent damage to a carrier structure (such as a baby stroller handle) that is already covered or coated with a material such as foam rubber. In certain embodiments, the arcuate inner surfaces and/or the one or more resilient materials may embody gripping surfaces. In certain embodiments, the first arcuate inner surface comprises a first arc length, the second arcuate inner surface comprises a second arc length, and the second arc length is at least about twice the first arc length Separately from the jaw opening, the hanger further includes a pivoting gate element that is operable by a user to selectively open a gate opening to provide access to a hook portion, whereby one or more articles may be hung from an interior surface of the hook portion. In certain embodiments, the pivoting gate element comprises a metal rod or sturdy metal wire with multiple bends (e.g., four bends) arranged as part of a loop (e.g., which may be rectangular or trapezoidal shape), with the loop bounding a gap between segments of the rod or wire. In certain embodiments, the pivoting gate element is pivotally linked to the rocker element proximate to the second rocker end (e.g., along the depressible tab portion). In certain embodiments, the pivoting gate element is arranged to pivot inward toward the interior surface of the hook portion. In other embodiments, the pivoting gate element may be pivotally linked to the main body (e.g., proximate to the second body end) and/or may be arranged to pivot outward away from the interior surface of the hook portion.

In certain embodiments, the pivoting gate element is biased to resist pivotal movement, and thereby resist opening of the gate opening. In certain embodiments, a second biasing element (e.g., a torsion spring) may be configured to bias the pivoting gate element to resist opening of the gate opening. In certain embodiments, biasing of the pivoting gate element may be accomplished by providing first and second ends of a loop-type pivoting gate element that are inserted in first and second apertures defined in opposing side surfaces of the rocker element (or, alternatively, defined in the main body), with the ends of the pivoting gate element being axially offset from one another to cause the pivoting gate element to be biased to resist opening of the gate opening.

In certain embodiments, a tip portion of a pivoting gate element may be arranged to travel in an arcuate path when the pivoting gate element is actuated. In certain embodiments, a travel stop may be arranged to receive the tip portion of the pivoting gate element when the pivoting gate element is in an unactuated (e.g., closed) position. In certain embodiments, a travel stop may include a mechanical restraining element (e.g., a detent, a recess, a raised surface, or the like) and/or a magnetic restraining element (e.g., a combination of a magnet and a ferrous material) arranged to maintain the pivoting gate element in an unactuated (e.g., closed) position and thereby resist initial movement of the pivoting gate element. In certain embodiments, a travel stop incorporating mechanical and/or magnetic restraining elements may be provided together with a second biasing element arranged to resist opening of the gate opening; in other embodiments, a restraining element or a second biasing element may be provided. Through use of one or more restraining elements and/or a second biasing element, the gate opening may be maintained in a closed position unless and until the pivoting gate element is actuated (e.g., pivoted) by a user, thereby promoting secure retention of one or more articles that are hung from an interior surface of the hook portion within a containment zone that is bounded by the main body (including the hook portion), the pivoting gate element, and the rocker element.

In certain embodiments, the main body and the rocker element may be fabricated of a polymeric or composite material by a suitable method such as molding (e.g., injection molding). In other embodiments, one or more of the main body and the rocker element may be fabricated of metal by a suitable method such as by casting, stamping, machining, or the like. In certain embodiments, each of the main body and the rocker element may comprise a unitary element; in alternative embodiments, one or more of the main body and the rocker element may be composed of multiple pieces joined to one another by suitable means such as adhesives or mechanical fasteners.

In certain embodiments, the main body, the rocker element, or the pivoting gate element may include an integrated flashlight element, such as a battery-operated light emitting diode lamp including a control switch and a light emitting region. In certain embodiments, a flashlight element may be permanently affixed to the main body, the rocker element, or the pivoting gate element with adhesives or other fasteners. In certain embodiments, at least a portion of a flashlight element may be integrally molded with the main body or the rocker element. In certain embodiments, the flashlight element may be pointed in a generally downward direction to permit viewing and inspection of contents of bags or purses suspended from the hanger. In certain embodiments, a flashlight element may be integrated with the rocker element, and may be operated with a control switch (e.g., a pushbutton) located on or along the depressible tab portion.

In certain embodiments, the main body, the rocker element, or the pivoting gate element may include an integrated audible alarm generating element, such as a battery-powered alarm including a control switch (e.g., a pushbutton) and a speaker. An alarm generating element may be activated by a user in a situation when the user feels threatened, in order to draw attention to and/or summon help for the user. In certain embodiments, an alarm generating element may be permanently affixed to the main body, the rocker element, or the pivoting gate element with adhesives or other fasteners. In certain embodiments, at least a portion of an alarm generating element may be integrally molded with the main body or the rocker element.

FIGS. 1-11 illustrate various views of a manually actuatable hanger 2 for suspending articles from a tubular carrier structure according to a first embodiment, with jaws and a gate element both in an unactuated position. FIGS. 12A-12B illustrate the same hanger 2 in two positions in combination with a cylindrical carrier structure 60. As shown in the preceding figures, the hanger 2 includes a main body 10, a rocker element 30, and a pivoting gate element 55.

The main body 10 includes a first jaw portion 20 proximate to a first body end 11, a hook portion 16 proximate to a second body end 12, and an aperture-defining first pivot region 15 arranged generally between the first jaw portion 20 and the hook portion 16. The hook portion 16 includes an interior surface 19 arranged to receive one or more articles to be retained within a containment zone 58 that is bounded by the main body 10 (including the hook portion 16), the pivoting gate element 55, and the rocker element 30. The main body 10 further includes a curved outer wall 14, a lower extremity 18, side walls 13A, 13B, and the aperture-defining first pivot region 15 associated with the side walls 13A, 13B. The first pivot region 15 is arranged to be registered with an aperture-defining second pivot region 35 of the rocker element 30, with the aperture of the first pivot region 15 being arranged to receive a pivot pin 29 (which may be embodied in a rod or cylinder) extending through the first pivot region 15 and the second pivot region 35.

The rocker element 30 includes a first rocker end 31, a second rocker end 32, a second jaw portion 40 proximate to the first rocker end 31, and a depressible tab portion 34 proximate to the second rocker end 32. The depressible tab portion 34 is arranged along an outer wall between side walls 33A, 33B. The rocker element 30 further includes the aperture-defining second pivot region 35 associated with the side walls 33A, 33B, with the second pivot region 35 arranged to be registered with the first pivot region 15 of the main body 10, and with the aperture of the second pivot region 35 being arranged to receive the pivot pin 29. The rocker element 30 further includes an upper extremity 38 arranged along an outer surface proximate to the second jaw portion 40.

In combination, the first jaw portion 20 and the second jaw portion 40 define a jaw opening 28, with a mouth 25 being arranged between the first body end 11 and the first rocker end 31. As illustrated in FIGS. 1-5 and 7-11, a gap (corresponding to the mouth 25) remains between the first body end 11 and the first rocker end 31 when the jaw portions 20, 40 are in an unactuated position. This gap may be maintained by mating of the pivoting gate element 55 with a latch 9 having a lower detent 9A associated with a travel stop 8, wherein the latch 9 is arranged to protrude through a portion of the pivoting gate element 55 when a gate opening 50 is closed by the pivoting gate element 55. Preferably, the first jaw portion 20 includes a first arcuate inner surface 21 and a coating or insert of resilient material 22 received by the first arcuate inner surface 21. Similarly, the second jaw portion 40 includes a second arcuate inner surface 41 and a coating or insert of resilient material 42 received by the second arcuate inner surface 41. Preferably, the first and second arcuate inner surfaces 21, 41 and the resilient materials 22, 42 are shaped to receive a cylindrical or tubular carrier structure (such as the carrier structure 60 shown in FIGS. 12A-12B). The resilient materials 22, 42 are preferably arranged to grip the carrier structure.

With reference to FIGS. 1-11 as well as FIGS. 12A-12B, the pivoting gate element 55 includes upper end portions 51 arranged to be received by apertures defined in side walls 33A, 33B of the rocker element 30 (e.g., proximate to the second rocker end 32) to permit pivotal movement between the pivoting gate element 55 and the rocker element 30. The upper end portions 51 of the pivoting gate element 55 are coaxially aligned with one another. A lower segment 52 of the pivoting gate element 55 is arranged to be received by the lower detent 9A formed in the latch 9 associated with the travel stop 8. The pivoting gate element 55 includes two bends proximate to the upper end portions 51, includes two bends proximate to the lower segment 52, and forms a generally rectangular loop.

FIG. 7 is a right side cross-sectional view illustration of the hanger 2, taken along section line "A"-"A" illustrated in FIG. 5. A first biasing element 3 (e.g., embodied in or including a first torsion spring) is coaxially arranged with the pivot pin 29, and includes ends arranged to press against internal landing surfaces 17, 36 of the main body 10 and the rocker element 30, respectively. In this manner, the first biasing element 3 is configured to exert a rotational force between the main body 10 and the rocker element 30, and is configured to resist expansion of the jaw opening 28 between the first jaw portion 20 and the second jaw portion 40. With continued reference to FIG. 7, a second biasing element 5 (e.g., embodied in or including a second torsion spring) includes one end arranged to press against an internal landing surface 37 of the rocker element 30 and includes an exposed end 5A arranged to press against the pivoting gate element 55. In this manner, the second biasing element 5 is configured to bias the pivoting gate element 55 to resist opening of the gate opening 50.

FIGS. 12A-12B illustrate the hanger 2 in different positions relative to the cylindrical carrier structure 60. FIG. 12A shows the hanger 2 in an actuated position, with the depressible tab portion 34 of the rocker element 30 pressed inwardly toward the main body 10. Preferably, the hanger is sized to permit four fingers of a user's hand to wrap around the curved outer wall 14 of the main body 10, while the user's thumb presses against the depressible tab portion 34 to cause such actuation. In the actuated position shown in FIG. 12A, the jaw opening 28 is in an expanded state (i.e., with a width exceeding a cross-sectional diameter of the cylindrical carrier structure 60), permitting the jaw opening 28 to receive the cylindrical carrier structure 60. At the same time, inward motion of the depressible tab portion 34 may cause the pivoting gate element 55 to be translated inward, such that the lower segment 52 of the pivoting gate element 55 may lose contact with the travel stop 8 and associated latch 9 and lower detent 9A.

FIG. 12B shows the hanger 2 in an unactuated position, following release of pressure applied to the depressible tab portion 34. Upon release of pressure applied to the depressible tab portion 34, the first biasing element 3 causes the first and second jaw portions 20, 40 to move toward one another, thereby contracting the jaw opening 28 and causing the first and second jaw portions 20, 40 (preferably including resilient materials 22, 42) to engage and grip the cylindrical carrier structure 60. In such a state, the gap between the first body end 11 and the first rocker end 31 (corresponding to the mouth 25) is smaller than the cross-sectional diameter of the cylindrical carrier structure 60. FIG. 12B also shows the pivoting gate element 55 in a position pivoted inward toward the interior surface 19 of the hook portion 16. Such position may be attained by manually pressing the pivoting gate element 55 inward with sufficient force to overcome a rotational force exerted by the second biasing element 5 against the pivoting gate element 55. When the pivoting gate element 55 is arranged in such an open position, one or more articles (e.g., purse handles, bag handles, or the like) may be inserted through the gate opening 50 into the containment zone 58 and hung from the interior surface 19 of the hook portion 16.

FIGS. 13-23 illustrate various views of a manually actuatable hanger 102 for suspending articles from a tubular carrier structure according to a second embodiment, with jaws and a gate element both in an unactuated position. FIGS. 24A-24B illustrate the same hanger 102 in two positions in combination with a cylindrical carrier structure 160. As shown in the preceding figures, the hanger 102 includes a main body 110, a rocker element 130, and a pivoting gate element 155. A primary difference between the hanger 102 according to the second embodiment and the hanger 2 according to the first embodiment is the structure used for biasing the pivoting gate element.

The main body 110 includes a first jaw portion 120 proximate to a first body end 111, a hook portion 116 proximate to a second body end 112, and an aperture-defining first pivot region 115 arranged generally between the first jaw portion 120 and the hook portion 116. The hook portion 116 includes an interior surface 119 arranged to receive one or more articles to be retained within a containment zone 158 that is bounded by the main body 110 (including the hook portion 116), the pivoting gate element 155, and the rocker element 130. The main body 110 further includes a curved outer wall 114, a lower extremity 118, side walls 113A, 113B, and the aperture-defining first pivot region 115 associated with the side walls 113A, 113B. The first pivot region 115 is arranged to be registered with an aperture-defining second pivot region 135 of the rocker element 130, with the aperture of the first pivot region 115 being arranged to receive a pivot pin 129 (which may be embodied in a rod or cylinder) extending through the first pivot region 115 and the second pivot region 135.

The rocker element 130 includes a first rocker end 131, a second rocker end 132, a second jaw portion 140 proximate to the first rocker end 131, and a depressible tab portion 134 proximate to the second rocker end 132. The depressible tab portion 134 is arranged along an outer wall between side walls 133A, 133B. The rocker element 130 further includes the aperture-defining second pivot region 135 associated with the side walls 133A, 133B, with the second pivot region 135 arranged to be registered with the first pivot region 115 of the main body 110, and with the aperture of the second pivot region 135 being arranged to receive the pivot pin 129. The rocker element 130 further includes an upper extremity 138 arranged along an outer surface proximate to the second jaw portion 140.

In combination, the first jaw portion 120 and the second jaw portion 140 define a jaw opening 128, with a mouth 125 being arranged between the first body end 111 and the first rocker end 131. As illustrated in FIGS. 13-18 and 19-23, a gap (corresponding to the mouth 125) remains between the first body end 111 and the first rocker end 131 when the jaw portions 120, 140 are in an unactuated position. This gap may be maintained by mating of the pivoting gate element 155 with a latch 109 having a lower detent 109A associated with a travel stop 108, wherein the latch 109 is arranged to protrude through a portion of the pivoting gate element 155 when a gate opening 150 is closed by the pivoting gate element 155. Preferably, the first jaw portion 120 includes a first arcuate inner surface 121 and a coating or insert of resilient material 122 received by the first arcuate inner surface 121. Similarly, the second jaw portion 140 includes a second arcuate inner surface 141 and a coating or insert of resilient material 142 received by the second arcuate inner surface 141. Preferably, the first and second arcuate inner surfaces 121, 141 and the resilient materials 122, 142 are shaped to receive a cylindrical or tubular carrier structure (such as the carrier structure 160 shown in FIGS. 24A-24B). The resilient materials 122, 142 are preferably arranged to grip the carrier structure.

With reference to FIGS. 13-23 as well as FIGS. 24A-24B, the pivoting gate element 155 includes upper end portions 151A, 151B arranged to be received by apertures defined in side walls 133A, 133B of the rocker element 130 (e.g., proximate to the second rocker end 132) to permit pivotal movement between the pivoting gate element 155 and the rocker element 130. A lower segment 152 of the pivoting gate element 155 is arranged to be received by the lower detent 109A formed in the latch 109 associated with the travel stop 108. The pivoting gate element 155 includes two bends proximate to the upper end portions 151A, 151B, includes two bends proximate to the lower segment 152, and forms a generally rectangular loop. The upper end portions 151A, 151B of the pivoting gate element 155 are axially offset relative to one another, with the first upper end portion 151A being arranged higher than the second end portion 151B (e.g., as shown in FIGS. 19, 23, 24A, and 24B). Such offset between the upper end portions 151A, 151B causes the pivoting gate element 155 to twist slightly when it is pressed inward (e.g., as shown in FIG. 24B), and thereby causes the pivoting gate element 155 to be biased to resist opening of the gate opening 150. Providing axially offset upper end portions 151A, 151B of the pivoting gate element 155 eliminates the need for a separate second biasing element (e.g., second torsion spring) used in the first embodiment of FIGS. 1 to 12B.

FIG. 19 is a right side cross-sectional view illustration of the hanger 102, taken along section line "B"-"B" illustrated in FIG. 17. A first biasing element 103 (e.g., embodied in or including a first torsion spring) is coaxially arranged with the pivot pin 129, and includes ends arranged to press against internal landing surfaces 117, 136 of the main body 110 and the rocker element 130, respectively. In this manner, the first biasing element 103 is configured to exert a rotational force between the main body 110 and the rocker element 130, and is configured to resist expansion of the jaw opening 128 between the first jaw portion 120 and the second jaw portion 140. With continued reference to FIG. 19, the upper end portions 151A, 151B of the pivoting gate element 155 are axially offset relative to one another, with the first upper end portion 151A being arranged higher than the second end portion 151B.

FIGS. 24A-24B illustrate the hanger 102 in different positions relative to the cylindrical carrier structure 160. FIG. 24A shows the hanger 102 in an actuated position, with the depressible tab portion 134 of the rocker element 130 pressed inwardly toward the main body 110. Preferably, the hanger 102 is sized to permit four fingers of a user's hand to wrap around the curved outer wall 114 of the main body 110, while the user's thumb presses against the depressible tab portion 134 to cause such actuation. In the actuated position shown in FIG. 24A, the jaw opening 128 is in an expanded state (i.e., with a width exceeding a cross-sectional diameter of the cylindrical carrier structure 160), permitting the jaw opening 128 to receive the cylindrical carrier structure 160. At the same time, inward motion of the depressible tab portion 134 may cause the pivoting gate element 155 to be translated inward, such that the lower segment 152 of the pivoting gate element 155 may lose contact with the travel stop 108 and associated latch 109 and lower detent 109A.

FIG. 24B shows the hanger 102 in an unactuated position, following release of pressure applied to the depressible tab portion 134. Upon release of pressure applied to the depressible tab portion 134, the first biasing element 103 causes the first and second jaw portions 120, 140 to move toward one another, thereby contracting the jaw opening 128 and causing the first and second jaw portions 120, 140 (preferably including resilient materials 122, 142) to engage and grip the cylindrical carrier structure 160. In such a state, the gap between the first body end 111 and the first rocker end 131 (corresponding to the mouth 125) is smaller than the cross-sectional diameter of the cylindrical carrier structure 160. FIG. 24B also shows the pivoting gate element 155 in a position pivoted inward toward the interior surface 119 of the hook portion 116. Such position may be attained by manually pressing the pivoting gate element 155 inward with sufficient force to overcome rotational resistance caused by axially offset upper ends 151A, 151B of the pivoting gate element 155. When the pivoting gate element 155 is arranged in such an open position, one or more articles (e.g., purse handles, bag handles, or the like) may be inserted through the gate opening 150 into the containment zone 158 and hung from the interior surface 119 of the hook portion 116.

Although FIGS. 1-6, 8, and 9 illustrate various lines visible along exterior surfaces of the main body 10 and the rocker element 30 (and FIGS. 13-18, 20, and 21 illustrate various lines visible along exterior surfaces of the main body 110 and the rocker element 130), it is to be appreciated that such lines are provided to depict contours of the respective hangers 2, 102 without the lines necessarily representing ornamental features. The renderings of FIGS. 10, 11, 22, and 23 demonstrate that external surfaces of the hangers 2, 102 may be devoid of lines or other ornamentation in certain embodiments.

With reference to FIGS. 12A-12B and 24A-24B, the hangers 2, 102 described herein may be used in a method for suspending one or more articles from a cylindrical or tubular structure, with the method including multiple steps. A first step includes pressing the depressible tab portion 34, 134 toward the hook portion 16, 116 to cause the second jaw portion 40, 140 to pivot away from the first jaw portion 20, 120 and expand the jaw opening 28, 128. A second step includes inserting the cylindrical or tubular carrier structure 60, 160 into the jaw opening 28, 128. A third step includes releasing pressure applied to the depressible tab portion 34, 134 to cause the first jaw portion 20, 120 and the second jaw portion 40, 140 to grip the cylindrical or tubular carrier structure 60, 160. A fourth step includes operating the pivoting gate element 55, 155 to open the gate opening 50, 150. A fifth step includes inserting the one or more articles through the gate opening 50, 150 to be hung from the interior surface 19, 119 of the hook portion 16, 116.

FIG. 25 is a perspective view of a manually actuatable hanger 102 including a main body 110, a rocker element 130, and a pivoting gate element 155 as disclosed herein affixed to a cylindrical or tubular carrier structure 160 of a mobile vehicle 170 (such as a baby stroller or a shopping cart), with a handle 176 of an article 175 suspended from the hanger.

FIG. 26 is a right side elevation view illustration of a manually actuatable hanger 202 for suspending articles from a cylindrical or tubular carrier structure according to a third embodiment, with the hanger 202 including an integrated flashlight element 280 having a control switch 281 (e.g., a pushbutton) and a light emitting surface 282. The flashlight element 280 may be powered by an internal battery (not shown). The hanger 202 further includes a main body 210, a rocker element 230, and a pivoting gate element 255 that are the same or substantially similar to the corresponding elements described previously herein in connection with the first and second embodiments.

FIG. 27 is a right side elevation view illustration of a manually actuatable hanger 302 for suspending articles from a cylindrical or tubular carrier structure according to a fourth embodiment, with the hanger 302 including an audible alarm generating element 390 having a control switch 391 (e.g., a pushbutton) and a speaker 395. The audible alarm generating element 390 may be powered by an internal battery (not shown). The hanger 302 further includes a main body 310, a rocker element 330, and a pivoting gate element 355 that are the same or substantially similar to the corresponding elements described previously herein in connection with the first and second embodiments.

Upon reading the following description in light of the accompanying drawing figures, those skilled in the art will understand the concepts of the disclosure and will recognize applications of these concepts not particularly addressed herein. Those skilled in the art will recognize improvements and modifications to the preferred embodiments of the present disclosure. All such improvements and modifications are considered within the scope of the concepts disclosed herein and the claims that follow.

What is claimed is:

1. A manually actuatable hanger comprising:
a main body comprising a first body end, a second body end, a first jaw portion proximate to the first body end, a hook portion proximate to the second body end, and a first pivot region between the first jaw portion and the hook portion;
a rocker element comprising a first rocker end, a second rocker end, a second jaw portion proximate to the first rocker end, a manually depressible tab portion proximate to the second rocker end, and a second pivot region arranged between the second jaw portion and the depressible tab portion;
a first biasing element configured to exert a rotational force between the main body and the rocker element, and configured to resist expansion of a jaw opening between the first jaw portion and the second jaw portion; and
a pivoting gate element extending between the depressible tab portion and the second body end;
wherein:
the second pivot region is registered with the first pivot region and permits the rocker element to pivot relative to the main body;
the second jaw portion is configured to be pivoted away from the first jaw portion to expand the jaw opening when the depressible tab portion is pressed by a user toward the hook portion;
a gate opening is provided between the depressible tab portion and the second body end; and
the pivoting gate element is operable by the user to selectively open the gate opening to provide access to the hook portion, whereby one or more articles may be hung from an interior surface of the hook portion.

2. The manually actuatable hanger of claim 1, further comprising a pivot pin, a pivot rod, or a pivot cylinder extending through the first pivot region and the second pivot region.

3. The manually actuatable hanger of claim 1, wherein the pivoting gate element is pivotally linked to the rocker element proximate to the second rocker end, and is arranged to pivot inward toward the interior surface of the hook portion.

4. The manually actuatable hanger of claim 3, wherein the pivoting gate element is biased to resist opening of the gate opening.

5. The manually actuatable hanger of claim 4, wherein the pivoting gate element comprises a first end received in a first aperture defined in a first side surface of the depressible tab portion, the pivoting gate element comprises a second end received in a second aperture defined in a second side surface of the depressible tab portion, and the first aperture and the second aperture are axially offset from one another to cause the pivoting gate element to be biased to resist opening of the gate opening.

6. The manually actuatable hanger of claim 1, further comprising a second biasing element configured to bias the pivoting gate element to resist opening of the gate opening.

7. The manually actuatable hanger of claim 1, wherein the first jaw portion and the second jaw portion are configured to receive and to grip a cylindrical or tubular carrier structure.

8. The manually actuatable hanger of claim 7, wherein the first jaw portion comprises a first arcuate inner gripping surface, and the second jaw portion comprises a second arcuate inner gripping surface.

9. The manually actuatable hanger of claim 8, wherein the first arcuate inner gripping surface comprises a first arc length, the second arcuate inner gripping surface comprises a second arc length, and the second arc length is at least about twice the first arc length.

10. The manually actuatable hanger of claim 7, further comprising a resilient material arranged in or along the first jaw portion and the second jaw portion.

11. The manually actuatable hanger of claim 1, further comprising a travel stop arranged at the second body end, wherein the travel stop comprises an inwardly protruding tab arranged to protrude through a portion of the pivoting gate element when the gate opening is closed by the pivoting gate element.

12. The manually actuatable hanger of claim 1, further comprising a battery-powered flashlight element that is affixed to or integrated with one of the main body, the rocker element, or the pivoting gate element.

13. The manually actuatable hanger of claim 1, further comprising a battery-powered audible alarm generating element that is affixed to or integrated with one of the main body, the rocker element, or the pivoting gate element.

14. A method for suspending one or more articles from a cylindrical or tubular carrier structure using a manually actuatable hanger comprising a main body comprising a first body end, a second body end, a first jaw portion proximate to the first body end, a hook portion proximate to the second body end, and a first pivot region between the first jaw portion and the hook portion; a rocker element comprising a first rocker end, a second rocker end, a second jaw portion proximate to the first rocker end, a manually depressible tab portion proximate to the second rocker end, and a second pivot region arranged between the second jaw portion and the depressible tab portion; a first biasing element configured to exert a rotational force between the main body and the rocker element, and configured to resist expansion of a jaw opening between the first jaw portion and the second jaw portion; and a pivoting gate element extending between the depressible tab portion and the second body end; wherein the second pivot region is registered with the first pivot region and permits the rocker element to pivot relative to the main body; the second jaw portion is configured to be pivoted away from the first jaw portion to expand the jaw opening when the depressible tab portion is pressed by a user toward the hook portion; a gate opening is provided between the depressible tab portion and the second body end; and the pivoting gate element is operable by the user to selectively open the gate opening to provide access to the hook portion, whereby the one or more articles may be hung from an interior surface of the hook portion, the method comprising:
pressing the depressible tab portion toward the hook portion to cause the second jaw portion to pivot away from the first jaw portion and expand the jaw opening;
inserting the cylindrical or tubular carrier structure into the jaw opening;
releasing pressure applied to the depressible tab portion to cause the first jaw portion and the second jaw portion to grip the cylindrical or tubular carrier structure;
operating the pivoting gate element to open the gate opening; and
inserting the one or more articles through the gate opening to be hung from the interior surface of the hook portion.

15. The method of claim 14, wherein the pivoting gate element is pivotally linked to the rocker element proximate to the second rocker end, and is arranged to pivot inward toward the interior surface of the hook portion.

16. The method of claim 14, wherein the pivoting gate element is biased to resist opening of the gate opening.

17. The method of claim 14, wherein the first jaw portion comprises a first arcuate inner gripping surface, and the second jaw portion comprises a second arcuate inner gripping surface.

18. The method of claim 17, wherein the first arcuate inner gripping surface comprises a first arc length, the second arcuate inner gripping surface comprises a second arc length, and the second arc length is at least about twice the first arc length.

19. The method of claim 17, wherein the manually actuatable hanger further comprises a resilient material arranged in or along the first jaw portion and the second jaw portion.

20. The method of claim 14, wherein the manually actuatable hanger further comprises a travel stop arranged at the second body end, wherein the travel stop comprises an inwardly protruding tab arranged to protrude through a portion of the pivoting gate element when the gate opening is closed by the pivoting gate element.

* * * * *